Figure 1:
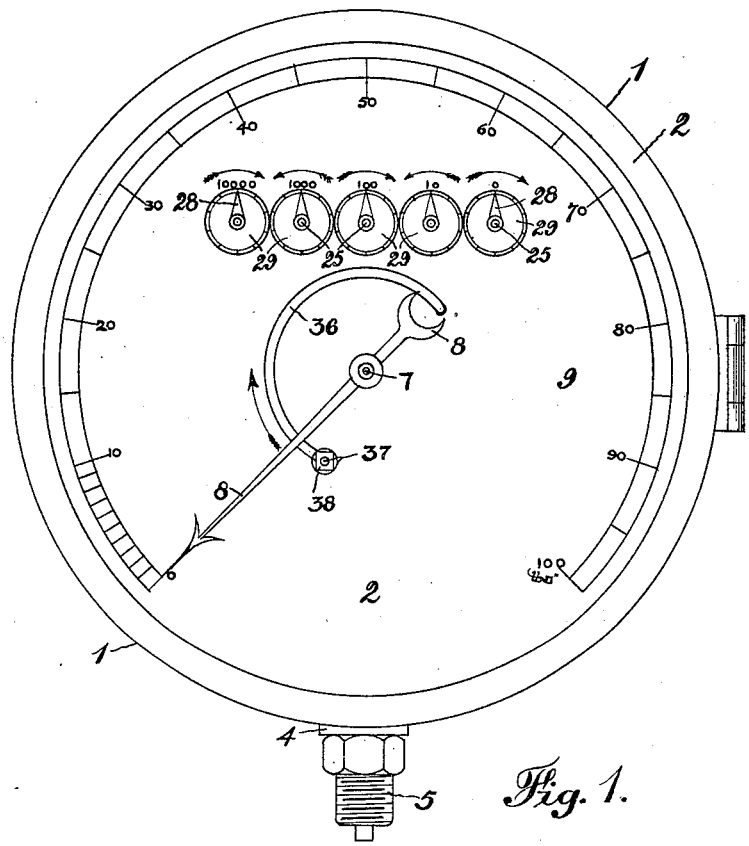

S. B. BILBROUGH.
REGISTERING AND INTEGRATING PRESSURE GAGE.
APPLICATION FILED FEB. 16, 1909.

999,740.

Patented Aug. 8, 1911.

2 SHEETS—SHEET 1.

Witnesses:
Chas. Ovendale
F. Ovendale

Inventor:
Sydney Brooks Bilbrough

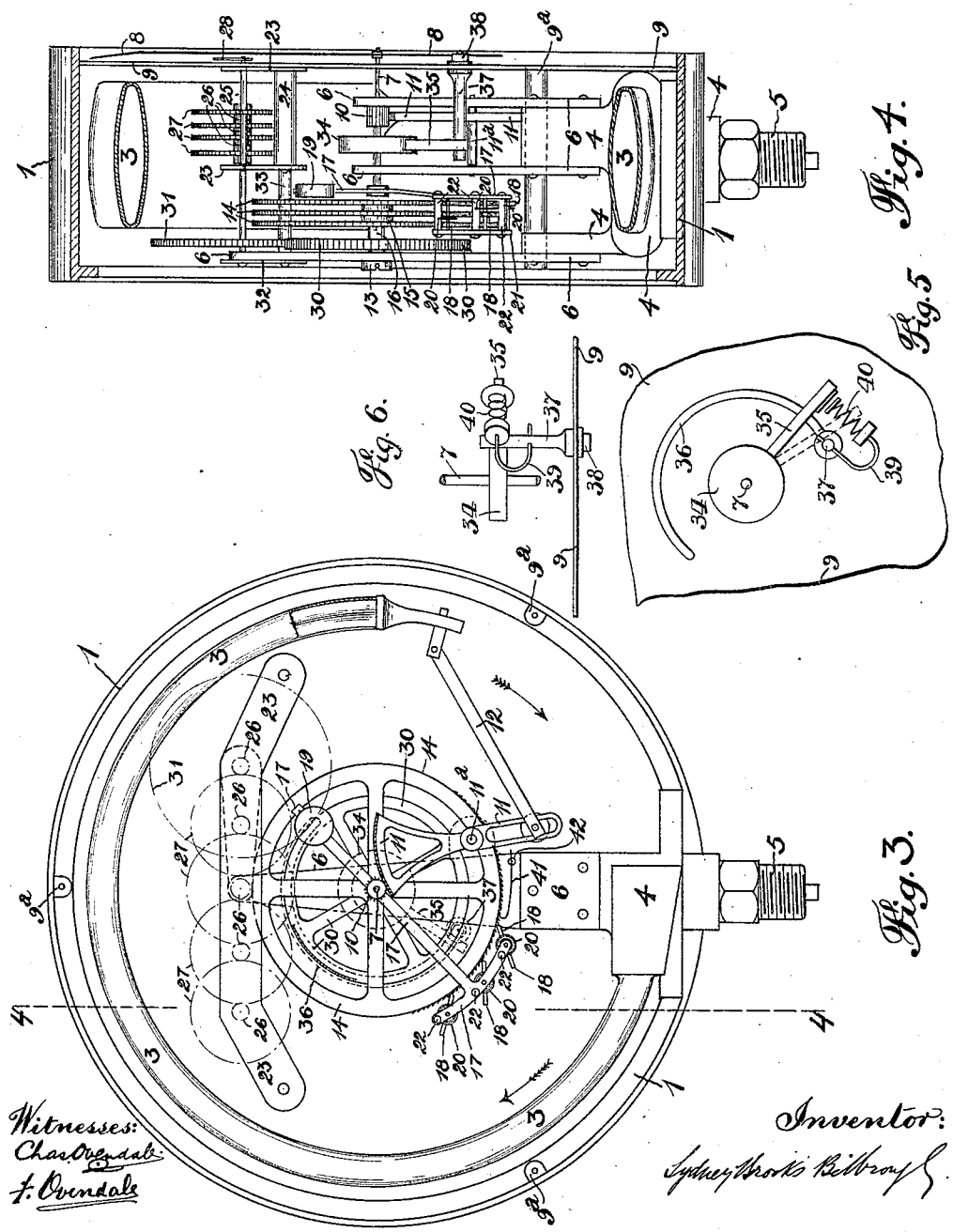

UNITED STATES PATENT OFFICE.

SYDNEY BROOKS BILBROUGH, OF JOHANNESBURG, TRANSVAAL.

REGISTERING AND INTEGRATING PRESSURE-GAGE.

999,740. Specification of Letters Patent. Patented Aug. 8, 1911.

Application filed February 16, 1909. Serial No. 478,272.

*To all whom it may concern:*

Be it known that I, SYDNEY BROOKS BILBROUGH, a subject of the King of Great Britain, and resident of Johannesburg, Transvaal, have invented certain new and useful Improvements in Registering and Integrating Pressure-Gages, of which the following is a specification.

This invention has reference to what I may designate a registering and integrating pressure gage, that is to say to an instrument adapted to integrate or total any series of fluid pressures produced successively and register the same on a meter.

The instrument consists of a Bourdon or like tube which is placed in communication through suitable tubular connections with any vessel whose internal fluid pressures it is desired to measure. The confined fluid influences the Bourdon tube in the well known manner and the resulting movement of the tube is utilized to actuate the mechanism of the registering and integrating means.

One important feature of the invention consists in utilizing the recoil energy of the Bourdon tube to actuate the registering and integrating mechanism. This obviates any retardation of the gage pointer and the connections between it and the tube during the initial or advance movement.

Another important feature of the invention relates to the construction of the ratchet mechanism which serves for transmitting the motion from the gage pointer spindle to the integrating mechanism, (with the object of making the instrument the more sensitive) and it consists in the employment of a plurality of pawls and ratchet wheels constructed and arranged to operate as hereinafter described.

A further feature relates to the provision of an adjustable stop which may be fixed at any convenient point in the return motion of the driving mechanism, in order that the absolute pressures totaled shall all be reckoned above any fixed zero or normal, if desired. I prefer to combine with said adjustable stop a retarding medium to bring the driving mechanism to rest gradually and without shock against said stop. This prevents the ratchet wheels, and with them the driving mechanism of the meter, being carried by their momentum beyond the driving pawls, after they are brought to rest by the stop.

In case the instrument is intended to be used for registering and integrating pressures following each other in rapid succession then I prefer to use a more mobile or less viscous fluid. If the application of the fluid pressures is sudden or is applied with considerable shock then I prefer to use a viscous fluid, or, alternatively I may contract the passage for the fluid to the Bourdon tube.

The invention will be more fully described by aid of the accompanying drawings illustrating a practical embodiment of the invention.

Figure 2:
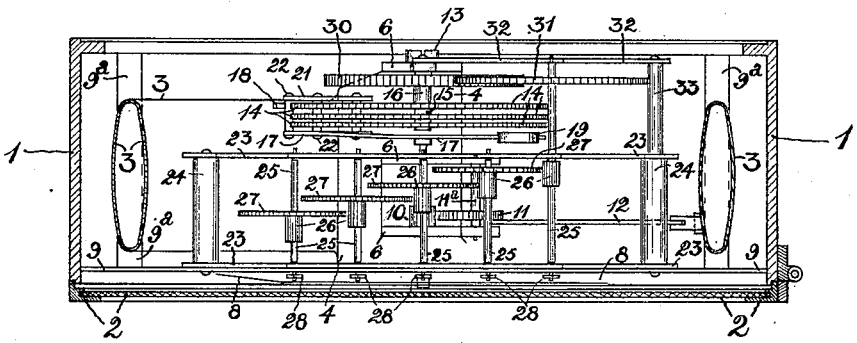

In the drawings Figure 1 is a front elevation of the instrument. Fig. 2 is a part sectional plan of Fig. 1. Fig. 3 is a front elevation of the instrument with the dial removed. Fig. 4 is a part sectional side elevation, the outer casing and Bourdon tube being shown in section on a plane represented by the dotted line 4—4 in Fig. 3. Fig. 5 is a detailed view of the adjustable stop and retarding medium for the driving mechanism, looking toward the back of the dial. Fig. 6 is a plan of Fig. 5.

1 is the outer casing of the instrument, to which, at the front is hinged the transparent cover 2.

3 is the Bourdon or like tube which is arranged inside the casing 1.

4 is the base which is rigid with the outer casing 1; to base 4 one end of the tube 3 is attached. The part 4 is formed with a screw-thread at 5 to make the connection with the vessel whose internal fluid pressures it is desired to measure. The base 4 has attached to it three vertical plates or brackets 6. Two of these brackets serve to rotatably support the pointer spindle 7, while the other carries the mechanism for driving the meter.

8 is the pointer which is fixed to the spindle 7 and serves for indicating the pressures in pounds per square inch on the dial 9—see Fig. 1,—which latter is fixed to lugs $9^a$ formed on the casing 1.

Upon the spindle 7 is provided a pinion 10, which is driven through the medium of quadrant 11 and link 12 from the free end of the Bourdon tube 3. Quadrant 11 is carried upon spindle $11^a$ rotatably supported between the plates 6.

13 Fig. 4 is a screw spindle, fixed to bracket 6, which serves as a bearing for the ratchet wheels 14, which are rigid with the boss or hub portion 15; hub 15 is attached to and rotates freely with sleeve 16 upon spindle 13.

17 is a pawl carrying member which is fixed upon the extremity of the pointer spindle 7. Member 17 at one end carries the pawls 18 and at the other end has affixed to it a counterbalance weight 19. As shown more particularly in Figs. 2, 3 and 4 three of the pawls 18 are provided one for each ratchet wheel. Pawls 18 are fixed to spindles to which are attached the hair springs 20 which maintain the pawls in contact with the ratchet wheels with a very slight pressure. The pawls 18 are balanced by providing them with extensions beyond their centers of motion.

21 is a bearing plate which is connected rigidly to member 17 by means of distance pieces 22. The outer ends of the pawl spindles are rotatably supported between plate 21 and the member 17.

The provision of the three ratchet wheels and corresponding number of pawls reduces the back lash by one third the pitch of one tooth, one pawl only operating at one time.

The registering meter comprises the side plates 23 Fig. 2 connected by the distance pieces 24 and the spindles 25 upon which are provided the pinions 26 and spur wheels 27. The train of wheels as seen more particularly in Figs. 1 and 2 drive the several pointers 28 which register upon the dials 29 the total pressures to which the instrument is subjected.

30 is a spur wheel fixed to the ratchet wheel sleeve, and 31 is another spur wheel in gear with 30 and fixed to an extension of the first spindle of the meter. The spindle carrying spur wheel 31 is carried at its outer end by means of plate 32 which is fixed at the one end to bracket 6 and at the other end by means of distance piece 33 to one of the side plates 23.

34 Figs. 4 and 5 is a boss fixed to spindle 7 and having an arm 35. 36 is a circular slot formed in the dial 9 and 37 is a pin which constitutes the adjustable stop arranged in the slot 36. Stop 37 is adjustably retained in the slot 36 by means of a nut 38. 39 is a bracket to which is fixed a spiral buffer spring 40, with which the extremity of the arm 35 is adapted to engage before it engages the stop 37. The end of arm 35 is constructed with a recess to receive the outer and free end of the spring 40. The arm 35 is shown in dotted lines in the position it assumes to engage the stop 37—see Fig. 5.

41 in Fig. 3 represents a back lash pawl, which operates also as a brake on the ratchet wheels 14; it is fixed by means of pin 42 to the bracket 6.

In the working of the instrument the pressure of the fluid in the vessel connected with the tube 3 acts on said tube in the customary manner. The resulting motion of the free end of the tube is communicated to spindle 7 through quadrant 11 and link 12. This motion operates the pawl carrying member 17. When the pressure is released the recoil energy of the tube 3, by virtue of its connections with the spindle 7 rotates the pawl carrier 17. The pawls 18 engaging the ratchet wheels 14, transmit the rotatory motion to the sleeve 16 and spur wheel 30. Spur wheel 30 drives spur wheel 31 which in turn drives the spindle 25 which drives the meter. By the use of the hair springs 20 for maintaining the pawls 18 in contact with the ratchet wheels a very light pressure only is exerted by the pawls. This allows of the free forward movement of the pawl carrying member 17 and pointer 8 to accurately register the internal fluid pressure. When a series of successive fluid pressures is applied to the tube 3 these pressures are totaled and registered by the pointers 28 on the dials 29 of the meter. When the pressures to be totaled are all to be reckoned above a fixed zero or normal, this is effected by moving the stop 37 to the required position so that the stop 37 is engaged by the lever 35 at that point. By this means the recoil of the Bourdon tube can not entirely exhaust itself and the tube 3 comes to rest when the lever 35 engages the stop 37 so that the tube 3 remains in a condition of stress at this point. The position of stop 37 having been accurately set, the pressures registered by the pointers 28 are those pressures above this fixed zero. The forward motion of the Bourdon tube is not in any way retarded and consequently the true pressure is indicated by the pointer 8. It is only when the pressure is released that the recoil force of the Bourdon tube is utilized to drive the registering and integrating mechanism.

There will be a certain amount of lag due to the effort in driving the mechanism, and the stop must always be placed so far forward that the lever will reach the stop on its return. To insure this the stop will be placed well forward and thus insure that the lever shall always reach the stop and press on it with considerable force. The spring buffer 40 insures that the arm 35 is brought to rest gradually, while allowing it to reach the stop 37. If the lever strikes the stop sharply and at considerable speed, the ratchet wheels do not stop as suddenly, but their momentum carries them farther on. This would result in the pointers 28 indicating too much. By the insertion of the retarding medium this defect is obviated.

The pressure of the spring pawl 41 on the wheels 14, may, if desired be increased considerably in order to act as a brake to prevent superfluous motion, as well as to act as a back lash pawl.

Any suitable fluid may be used, such as liquids, oils of various viscosities, or water. A small quantity of gas or air mingled with the liquid would not impair the efficiency of the instrument, but rather tend to cushion any sudden jars or shocks.

Pressures produced suddenly or with great force may be relieved by throttling the fluid in its passage to the tube 3. Alternately a more viscous fluid may be used, which will act slower and thereby prevent the transmission of shocks to the mechanism. If the gage is required to register rapidly a mobile fluid such as water, benzene or paraffin must be used; at the same time these fluids are very rapid in communicating sudden pressures or shocks to the Bourdon tube. If the pressures are of an impulsive nature but ample time be given to register them, i. e., if the pressures do not succeed each other too rapidly, then a viscous fluid such as the heavy oils is the best. I prefer the use of a more viscous or mobile fluid for regulating the instrument than the throttling of the same fluid in the passages leading to the Bourdon tube.

What I claim as my invention and desire to protect by Letters Patent is:—

1. A registering and integrating pressure gage comprising a Bourdon tube, registering and integrating mechanism, means whereby said registering and integrating mechanism is actuated by the recoil energy of the tube, said means comprising a plurality of ratchet wheels, a pawl carrying member movable with the gage pointer spindle and a plurality of pawls in engagement with the ratchet wheels for transmitting the motion of the gage pointer spindle to the ratchet mechanism on the recoil movement of the tube, and an adjustable stop comprising a pin adjustable in a circular slot in the gage dial, and an arm fixed to the spindle of the gage pointer, and a retarding medium associated with said adjustable stop, said retarding medium comprising a bracket fixed to the adjustable pin and a spiral spring fixed to said bracket with which spring the arm fixed to the spindle of the gage pointer engages.

2. A registering and integrating pressure gage comprising in combination a Bourdon tube (3), a gage pointer spindle (7) and a pointer (8) fixed to said spindle, means for driving said spindle from the free end of the tube, a bracket (6), a spindle (13) fixed to bracket (6), a sleeve (16) loose upon spindle (13) a plurality of ratchet wheels (14) rigid with said sleeve (16), a counterbalanced pawl carrying member (17) fixed to the gage pointer spindle (7), a plurality of balanced pawls (18) carried by member (17), hair springs (20) fixed to the pawl spindles and maintaining the pawls in contact with the ratchet wheels with a very slight pressure, the pawls being set so as to reduce the back lash by one third the pitch of one tooth, so that one pawl only operates at a time, spur wheel (30) fixed to sleeve (16), a registering and integrating mechanism comprising spindles (25) pinions (26) and spur wheels (27), pointers (28) and dials (29) spur wheel (31) fixed on one of the spindles (25), said spur wheel (31) meshing spur wheel (30), the adjustable stop comprising pin (37) fixed in circular slot (36) in dial (9) and boss (34) fixed on spindle (7) said boss having arm (35) adapted to engage stop (37), and the retarding medium comprising bracket (39) fixed to pin (37) and spring (40) fixed to bracket (39).

In testimony whereof I have signed my name to this specification in the presence of two subscribing witnesses.

SYDNEY BROOKS BILBROUGH.

Witnesses:
CHAS. OVENDALE,
F. A. OVENDALE.

Copies of this patent may be obtained for five cents each, by addressing the "Commissioner of Patents, Washington, D. C."